United States Patent
Zhang

(10) Patent No.: US 9,979,797 B2
(45) Date of Patent: May 22, 2018

(54) METHODS AND APPARATUSES FOR FACILITATING UTILIZATION OF CLOUD SERVICES

(75) Inventor: Peng Zhang, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 288 days.

(21) Appl. No.: 14/417,448

(22) PCT Filed: Jul. 27, 2012

(86) PCT No.: PCT/IB2012/053868
§ 371 (c)(1),
(2), (4) Date: Jan. 26, 2015

(87) PCT Pub. No.: WO2014/016652
PCT Pub. Date: Jan. 30, 2014

(65) Prior Publication Data
US 2015/0195372 A1    Jul. 9, 2015

(51) Int. Cl.
*H04L 29/08* (2006.01)
*H04W 4/18* (2009.01)

(52) U.S. Cl.
CPC .............. *H04L 67/32* (2013.01); *H04L 67/04* (2013.01); *H04L 67/10* (2013.01); *H04L 67/18* (2013.01); *H04L 67/28* (2013.01); *H04W 4/18* (2013.01)

(58) Field of Classification Search
CPC .......... H04W 4/18; H04L 67/04; H04L 67/32; H04L 67/10; H04L 67/18; H04L 67/28
See application file for complete search history.

(56) References Cited

U.S. PATENT DOCUMENTS

| | | |
|---|---|---|
| 2009/0303880 A1 | 12/2009 | Maltz et al. |
| 2010/0238840 A1 | 9/2010 | Lu et al. |
| 2010/0248698 A1 | 9/2010 | In et al. |
| 2010/0318665 A1 | 12/2010 | Demmer et al. |
| 2010/0322255 A1 | 12/2010 | Hao et al. |

(Continued)

FOREIGN PATENT DOCUMENTS

| | | |
|---|---|---|
| CN | 102196027 A | 9/2011 |
| WO | WO 02/23362 A1 * | 3/2002 |

(Continued)

OTHER PUBLICATIONS

Extended European Search Report for corresponding European Application No. 12881611.3 dated Feb. 17, 2016, 7 pages.

(Continued)

*Primary Examiner* — Kim T Nguyen
(74) *Attorney, Agent, or Firm* — Alston & Bird LLP

(57) ABSTRACT

A method, apparatus and computer program product are to facilitate the utilization of cloud computing resources by a mobile terminal. From the standpoint of a mobile hub, a request for cloud services is received that has been issued by an application executed by a mobile terminal. An application agent is then created based upon the application that issued the request and a request is caused to be transmitted to a cloud service provider in response to the request for cloud services. A response is then received from the cloud service provider and a response is caused to be provided to the mobile terminal based upon the response from the cloud service provider.

18 Claims, 13 Drawing Sheets

(56) References Cited

U.S. PATENT DOCUMENTS

| | | | |
|---|---|---|---|
| 2011/0151924 A1* | 6/2011 | Miller | H04W 48/18 455/552.1 |
| 2011/0314121 A1* | 12/2011 | Navda | H04W 4/18 709/217 |
| 2012/0054345 A1 | 3/2012 | Sahu et al. | |
| 2012/0072481 A1 | 3/2012 | Nandlall et al. | |
| 2012/0096149 A1 | 4/2012 | Sunkara et al. | |

FOREIGN PATENT DOCUMENTS

| | | |
|---|---|---|
| WO | WO 2004/061660 A2 | 7/2004 |
| WO | WO 2004/098113 A2 | 11/2004 |
| WO | WO 2009/099637 A2 | 8/2009 |
| WO | WO 2012/042509 | 4/2012 |

OTHER PUBLICATIONS

Chun, et al.; "Clone-Clouds: Elastic Execution Between Mobile Device and Cloud"; *Proceedings of the 6th Conference on Computer Systems (EuroSys)*; Apr. 2011; pp. 301-314.

Satyanarayanan, et al.; "The Case for VM-Based Cloudlets and Mobile Computing"; *IEEE Pervasive Computing;* vol. 8, No. 4; Oct. 2009; pp. 14-23.

Jin, et al.; "Cloud Assisted P2P Media Streaming for Bandwidth Constrained Mobile Subscribers" *Proceedings of the 16th IEEE International Conference on Parallel and Distributed Systems (ICPADS)*; Jan. 2011; p. 800.

Chen, et al.; "SaaAs—The Mobile Agent Based Service for Cloud Computing in Internet Environment"; vol. 6; Aug. 10-12, 2010; pp. 2935-2939.

International Search Report and Written Opinion from International Application No. PCT/IB2012/053868, dated Jul. 2, 2013.

Extreme Networks Solution Overiew: Managed Hosting and Cloud Data Center Solution; Extreme Networks [online] [retrieved 2012]. Retrieved from the Internet: <URL: http://www.extremenetworks.com/libraries/solutions/SOManagedHostingCloud_1776.pdf>. 5 pages.

Office Action from Chinese Patent Application No. 201280074913.7 dated Jul. 21, 2017, 12 pages.

Office Action from Chinese Patent Application No. 201280074913.7 dated Mar. 6, 2018, with English summary, 6 pages.

* cited by examiner

METHODS AND APPARATUSES FOR FACILITATING UTILIZATION OF CLOUD SERVICES

TECHNOLOGICAL FIELD

An example embodiment of the present invention relates generally to the utilization of cloud services and, more particularly, to a method, apparatus and computer program product for facilitating communication with cloud service providers.

BACKGROUND

Mobile terminals, such as cellular telephones, smartphones, personal digital assistants (PDAs), tablet computers, laptop computers and the like, have become an integral part of many people's work and home lives and serve as a convenient and effective communication tool. Mobile terminals provide an increasingly rich feature set which serves to enhance the user experience by allowing users to access various services and mobile applications. As such, users of mobile terminals generate substantially more network traffic today than in the past, and it is estimated that this trend will only increase with the amount of network traffic generated by users of mobile terminals being substantially greater in the future.

Mobile terminals are at least somewhat resource constrained in terms of computation power, data storage, battery life and screen size. In this regard, the resource constraints relating to computation power, data storage and battery life are generally only exacerbated as the users of mobile terminals generate increasing amounts of network traffic. In an effort to address at least some of these resource constraints, cloud computing may support mobile terminals and permit even wide deployment of rich services by the mobile terminals. In this regard, cloud computing virtualizes physical and software resources and provides generic services, such as, infrastructure as a service (IaaS), software as a service (SaaS), etc. Relative to its support of mobile terminals, mobile cloud computing provides an infrastructure and associated mechanisms for providing computation and data storage capabilities to mobile devices. In comparison to a traditional information technology infrastructure, cloud computing may provide improvements with respect to scalability, agility and economic efficiency.

Referring now to FIG. 1, a mobile cloud computing system is illustrated in which one or more cloud service providers 12 may support a mobile terminal 10. In this regard, a mobile terminal may access one or more cloud service providers via a wireless network. Indeed, the mobile terminal may access a respective access network 14, such as a cellular network, a WiFi network or the like. The access network may, in turn, provide the mobile terminal with access to a wide area network 16, such as the Internet, that supports communication with the client service providers.

Although cloud computing offers a number of advantages, mobile terminals are generally not optimized in regard to the access and utilization of cloud computing resources. In this regard, mobile terminals are not generally optimized in terms of performance parameters, such as response time, computation costs or the like, with respect to utilization of cloud computing resources. Additionally, mobile cloud computing generally requires relatively frequent access and synchronization between the mobile terminals and cloud service providers. However, mobile networks may introduce considerable delay that may disadvantageously impact the performance and user experience with respect to the utilization of cloud services. Furthermore, the mobility of mobile terminals may cause the interruption or disconnection of cloud services such that mobile cloud computing may have difficulty supporting the mobility of mobile terminals and providing for a seamless user experience.

In order to enhance the provision of cloud services to mobile terminals, CloneCloud has been proposed by B. G. Chun, et al, in an article entitled "Clone Clouds: Elastic Execution Between Mobile Device and Cloud" in the Proceedings of the 6th Conference on Computer Systems (EuroSys), pages 301-314 (April 2011). CloneCloud utilizes nearby computers or data centers to increase the speed with which mobile terminals execute applications. In this regard, an entire set of data and applications of the mobile terminal may be cloned on to the cloud computing resources and then selectively executed with the results being reintegrated back into the mobile terminal.

A cloudlet has also been proposed by N. Satyanarayanan, et al. in an article entitled "The Case for VM-Based Cloudlets and Mobile Computing" in IEEE Pervasive Computing, Vol. 8, No. 4, pages 14-23 (October 2009). A cloudlet is a trusted, resource-rich computer or cluster of computers which is connected to the Internet and available for use by nearby mobile terminals. As such, in an instance in which a mobile terminal does not wish to offload processing or other workload to the cloud resources, such as' due to delay, cost, etc., a mobile terminal may locate and utilize a nearby cloudlet. In this regard, a mobile terminal may satisfy the demands for real-time interactive response with a low-latency, one-hop, high-bandwidth wireless access to the cloudlet. In an instance in which a cloudlet is unavailable, the mobile terminal may operate in accordance with the default mode, such as by requesting assistance from more distant cloud computing resources or, alternatively, relying solely upon its own resources.

Still further, X. Jin, et al., in an article entitled "Cloud Assisted P2P media Streaming for Bandwidth Constrained Mobile Subscribers" in the Proceedings of the 16th IEEE International Conference on Parallel and Distributed Systems (ICPADS), page 800 (January 2011) proposes to share a limited bandwidth among mobile terminals that are located in the same area and utilizing the same content. In this regard, the interaction among the mobile terminals is modeled as a coalitional game.

These and other techniques have provided offboard support for mobile terminals in order to address at least some of the resource constraints and to improve the performance of mobile terminals and the resulting user experience, although the performance and user experience offered by mobile terminals could be further improved.

BRIEF SUMMARY

A method, apparatus and computer program product are provided in accordance with an example embodiment in order to facilitate the utilization of cloud computing resources by a mobile terminal. By utilizing cloud computing resources in an efficient manner, a mobile terminal may execute applications, process data or otherwise perform various functions in a computationally efficient and timely manner. Thus, a mobile terminal may provide for increased data traffic and the deployment of rich services while remaining resource constrained in terms of computation power, data storage, battery life or the like by more efficiently utilizing the cloud computing resources.

In one embodiment, a method is provided that includes receiving a request for cloud services issued by an application executed by a mobile terminal. The method of this embodiment creates an application agent based upon the application that issued the request and causes a request to be transmitted to a cloud service provider in response to the request for cloud services. In this embodiment, the method also receives a response from the cloud service provider and causes a response to be provided to the mobile terminal based upon the response from the cloud service provider.

In another embodiment, an apparatus is provided that includes at least one processor and at least one memory, including computer program instructions with the at least one memory and the computer program instructions configured to, with the at least one processor, cause the apparatus at least to receive a request for cloud services issued by an application executed by a mobile terminal. The at least one memory and the computer program instructions are further configured to, with the at least one processor, cause the apparatus of this embodiment to create an application agent based upon the application that issued the request and to cause a request to be transmitted to a cloud service provider in response to the request for cloud services. The at least one memory and the computer program instructions are further configured to, with the at least one processor, cause the apparatus of this embodiment to receive a response from the cloud service provider and to cause a response to be provided to the mobile terminal based upon the response from the cloud service provider.

In a further embodiment, a computer program product is provided that includes at least one non-transitory computer-readable storage medium bearing computer program instructions embodied therein for use with a computer with the computer program instructions including instructions configured to receive a request for cloud services issued by an application executed by a mobile terminal. The computer program instructions of this embodiment also include instructions configured to create an application agent based upon the application that issued the request and instructions configured to cause a request to be transmitted to a cloud service provider in response to the request for cloud services. The computer program instructions of this embodiment also include instructions configured to receive a response form the cloud service provider and instructions configured to cause a response to be provided to the mobile terminal based upon the response from the cloud service provider.

In yet another embodiment, an, apparatus is provided that includes means for receiving a request for cloud services issued by an application executed by a mobile terminal, means for creating an application agent based upon the application that issued the request and means for causing a request to be transmitted to a cloud service provider in response to the request for cloud services. The apparatus of this embodiment also includes means for receiving a response from the cloud service provider and means for causing a response to be provided to the mobile terminal based upon the response from the cloud service provider.

In one embodiment, a method is provided that includes executing an application and, based upon the execution of the application, causing a request for cloud services to be issued to a mobile hub that is associated with a communications network. The method of this embodiment also includes receiving a response to the request from a cloud service provider via the mobile hub and continuing the execution of the application based at least in part upon the response to the request.

In another embodiment, an apparatus is provided that includes at least one processor and at least one memory including computer program instructions with the at least one memory and the computer program instructions configured to, with the at least one processor, cause the apparatus at least to execute an application and, based upon execution of the application, to cause a request for cloud services to be issued to a mobile hub that is associated with the communications network. The at least one memory and the computer program instructions are further configured to, with the at least one processor, cause the apparatus of this embodiment to receive a response to the request from a cloud service provider via the mobile hub and to continue the execution of the application based at least in part upon the response to the request.

In a further embodiment, a computer program product is provided that includes at least one non-transitory computer-readable storage medium bearing computer program instructions embodied therein for use with a computer with the computer program instructions including instructions configured to execute an application and, based upon execution of the application, instructions configured to cause a request for cloud services to be issued to a mobile hub that is associated with a communications network. The computer program instructions of this embodiment also include instructions configured to receive a response to the request from a cloud service provider via the mobile hub and instructions configured to continue the execution of the application based at least in part upon the response to the request.

In yet another embodiment, an apparatus is provided that includes means for executing an application and, based upon the execution of the application, means for causing a request for cloud services to be issued to a mobile hub that it associated with a communications network. The apparatus of this embodiment also includes means for receiving a response to the request from a cloud service provider via the mobile hub and means for continuing the execution of the application based at least in part upon the response to the request.

BRIEF DESCRIPTION OF THE DRAWINGS

Figure 1:
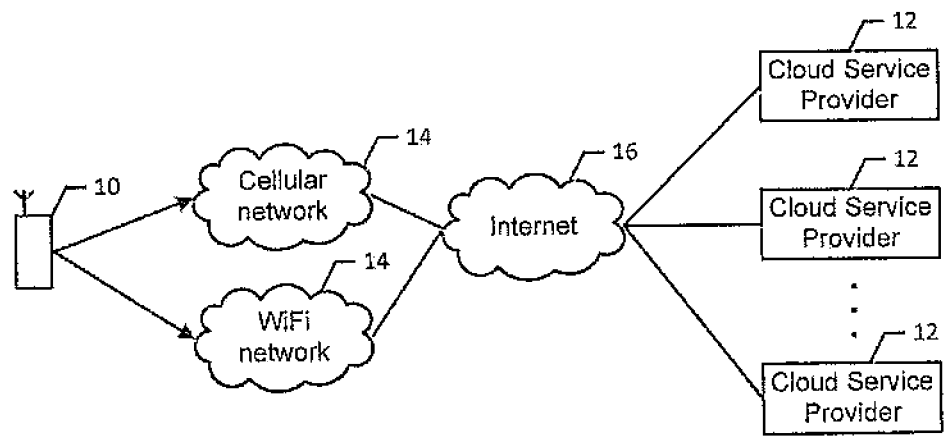
Figure 2:
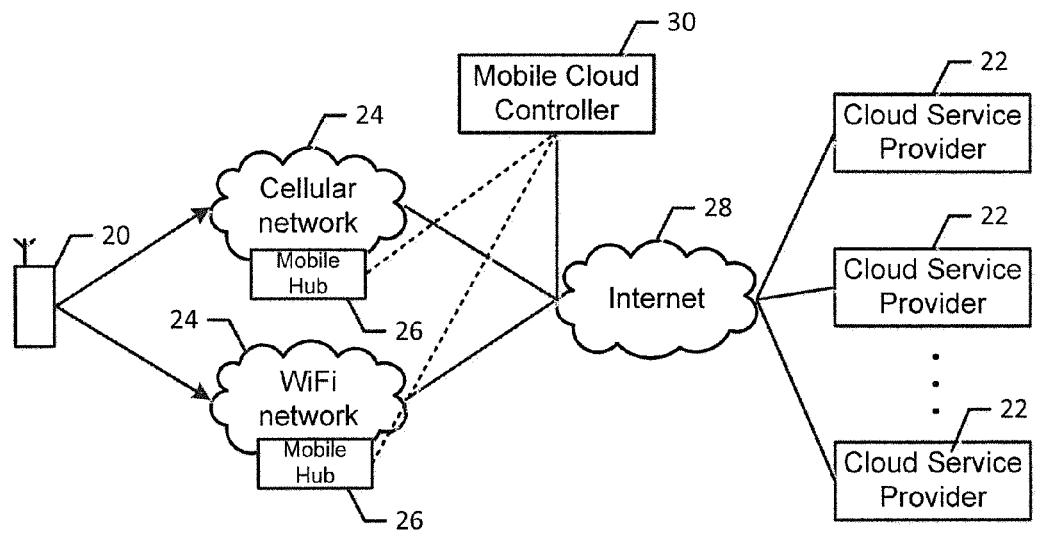
Figure 3:
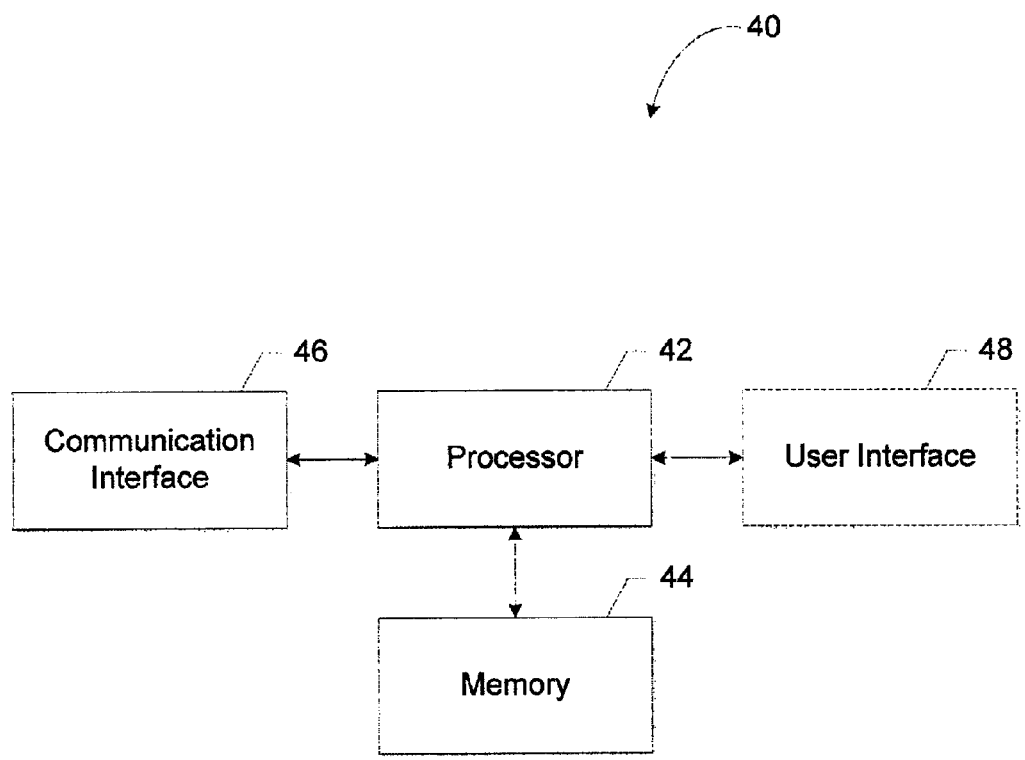
Figure 4:
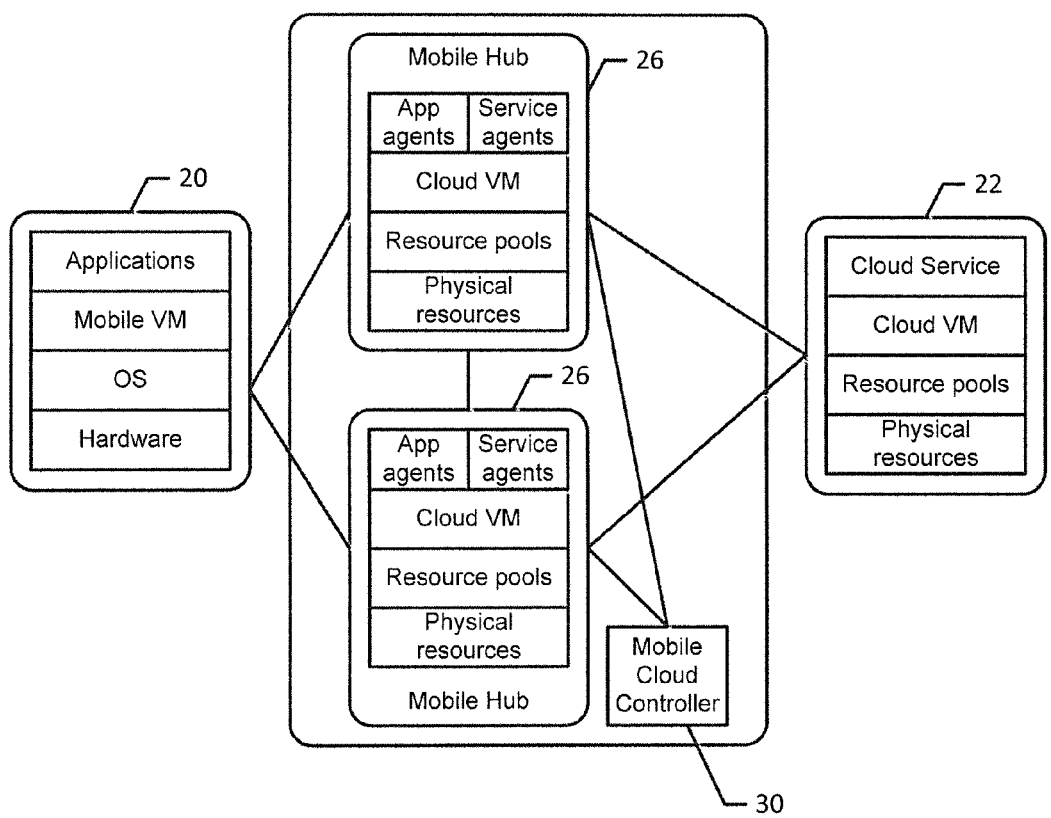
Figure 5:
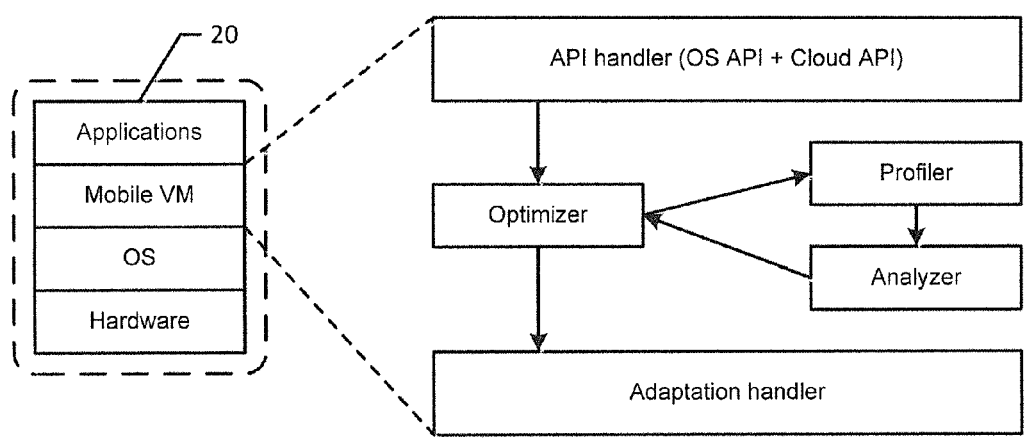
Figure 6:
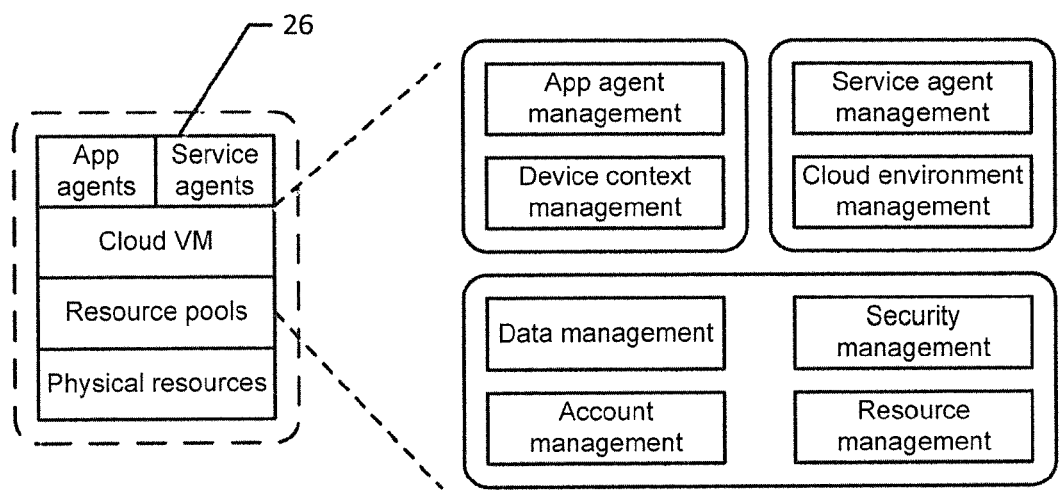
Figure 7:
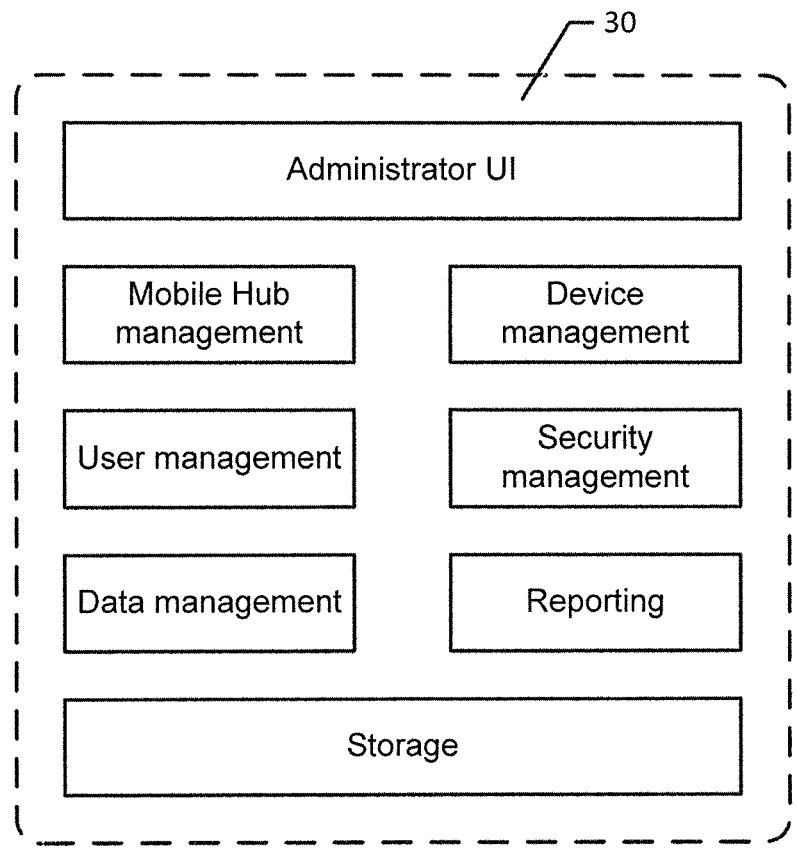
Figure 8:
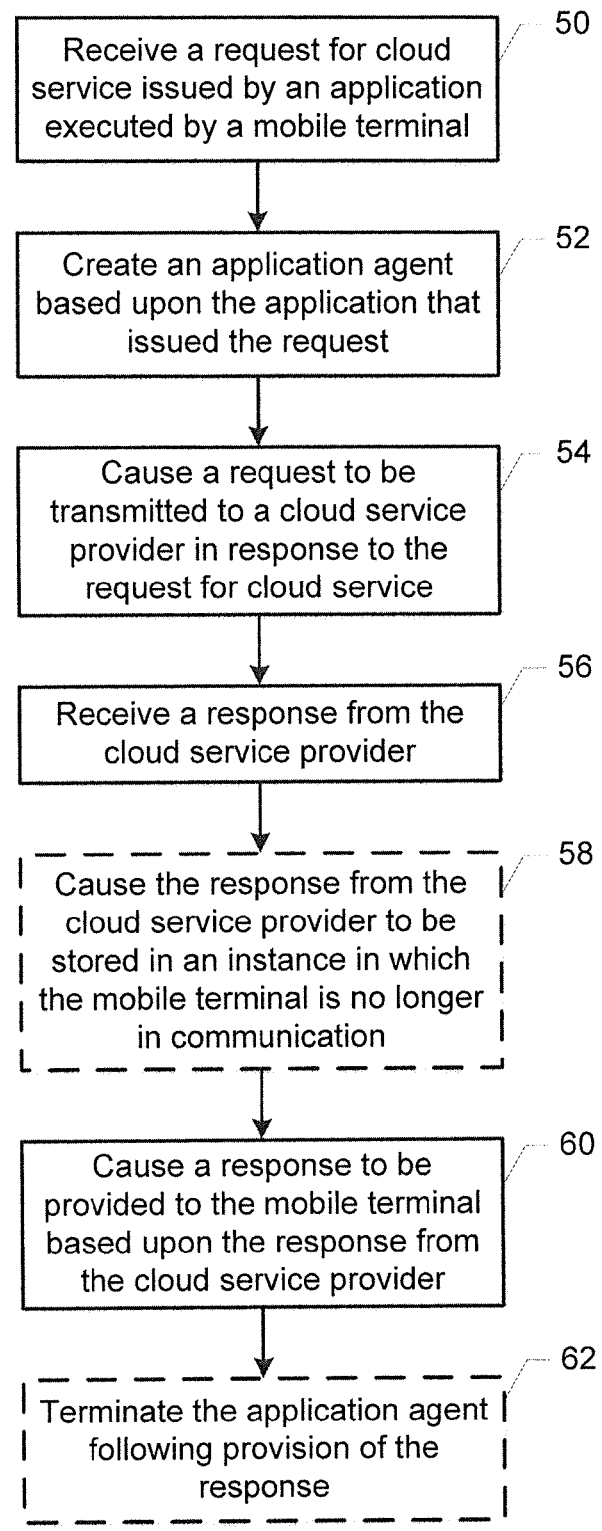
Figure 9:
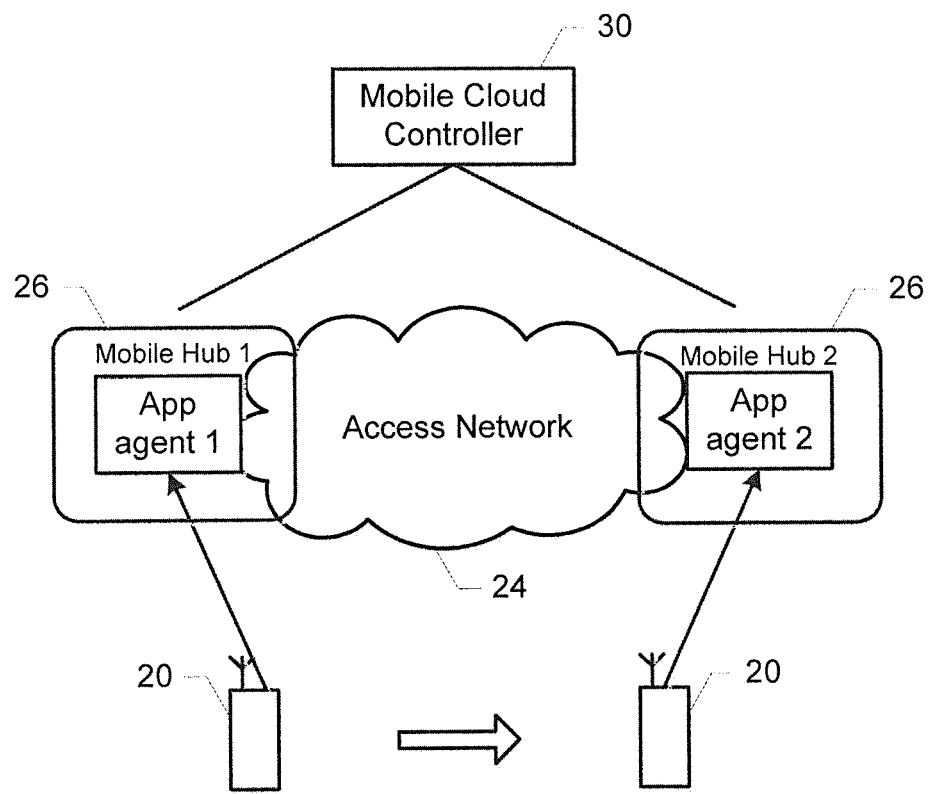
Figure 10:
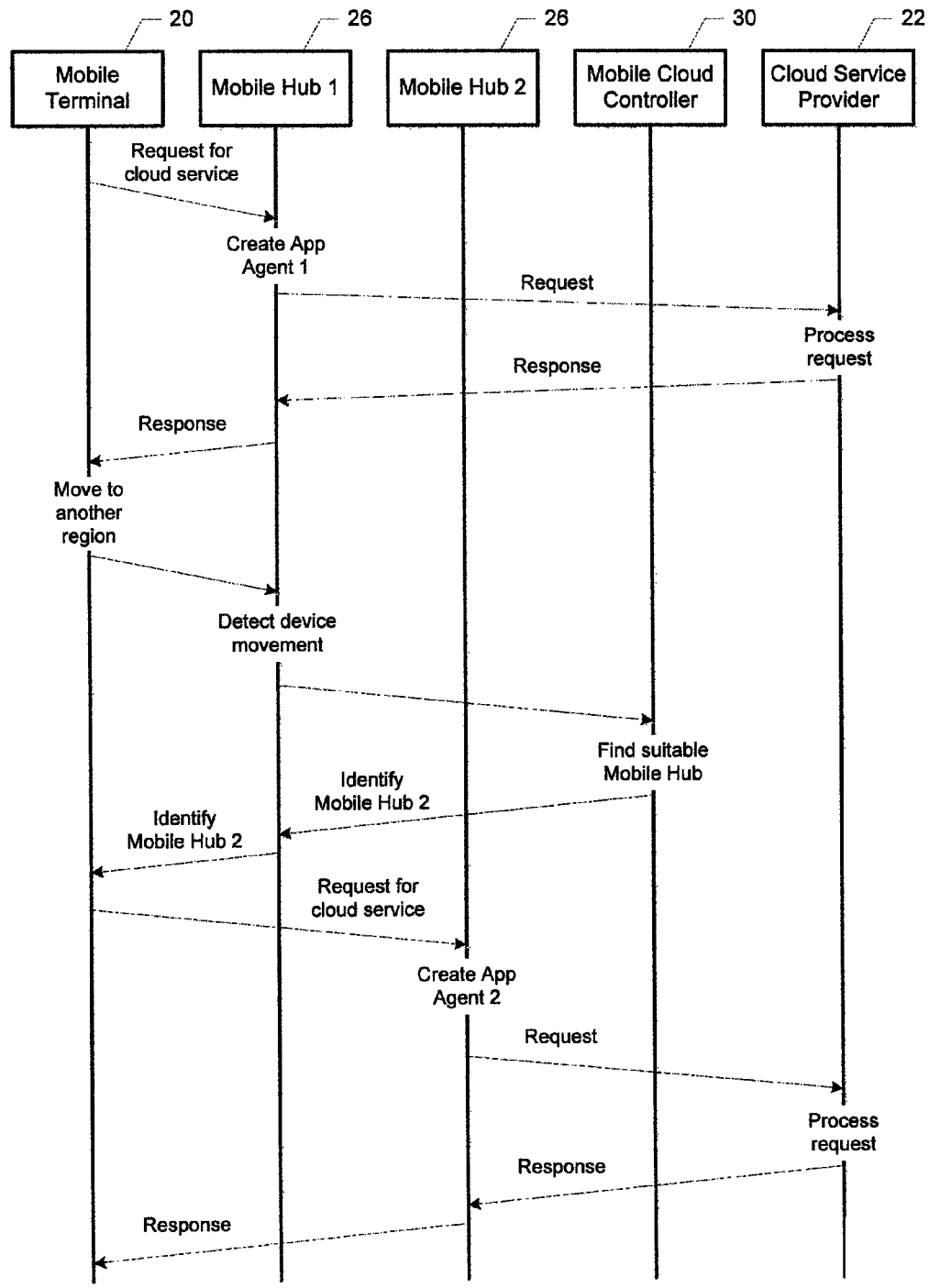
Figure 11:
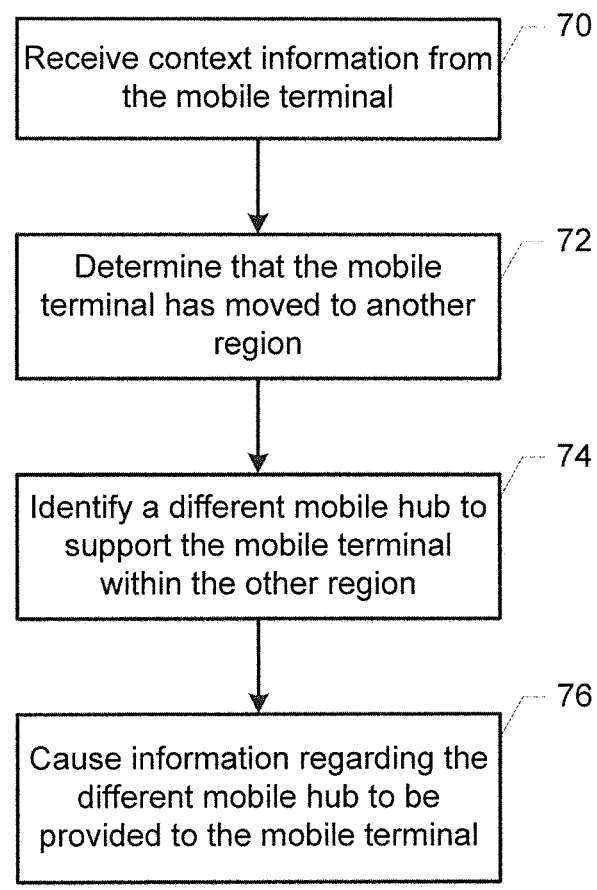
Figure 12:
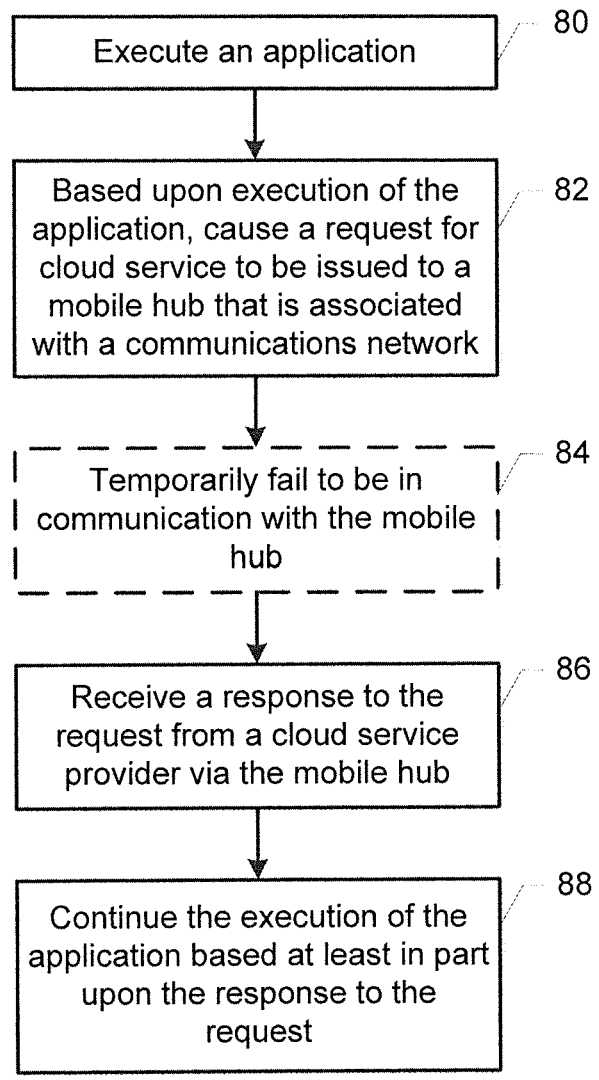
Figure 13:
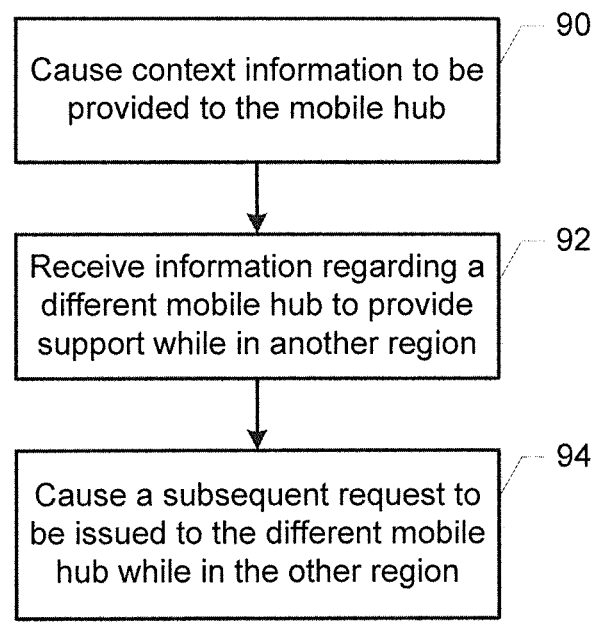

Having thus described certain example embodiments of the present invention in general terms, reference will hereinafter be made to the accompanying drawings, which are not necessarily drawn to scale, and wherein:

FIG. 1 is a schematic representation of a mobile cloud computing system;

FIG. 2 is a schematic representation of a mobile cloud computing system in accordance with an example embodiment of the present invention;

FIG. 3 is a block diagram of an apparatus that may be embodied by a mobile terminal or a mobile cloud service provider, such as a mobile hub, and that may be specifically configured in accordance with an example embodiment of the present invention;

FIG. 4 is an architectural representation of a mobile cloud computing system in accordance with an example embodiment of the present invention;

FIG. 5 is an architectural representation of a mobile terminal in accordance with an example embodiment of the present invention;

FIG. 6 is an architectural representation of a mobile hub in accordance with an example embodiment of the present invention;

FIG. 7 is an architectural representation of a mobile cloud controller in accordance with an example embodiment of the present invention;

FIG. 8 is a flow chart illustrating operations performed by an apparatus embodied by a mobile hub in accordance with an example embodiment of the present invention;

FIG. 9 is a schematic representation of a portion of a mobile cloud computing system in accordance with an example embodiment of the present invention that is configured to support a mobile terminal as the mobile terminal moves relative to the access network;

FIG. 10 is a signaling flow diagram associated with the mobile cloud computing system of FIG. 9 in accordance with an example embodiment of the present invention;

FIG. 11 is a block diagram illustrating operations performed by an apparatus embodied by a mobile hub in accordance with an example embodiment of the present invention in order to support a mobile terminal as a mobile terminal moves relative to an access network;

FIG. 12 is a flow chart illustrating the operations performed by an apparatus embodied by a mobile terminal in accordance with an example embodiment of the present invention; and FIG. 13 is a flow chart illustrating the operations performed by an apparatus embodied by the mobile terminal as the mobile terminal moves relative to an access network in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided according to example embodiments of the present invention in order to facilitate the utilization of cloud computing resources by mobile terminals. Among other features, the method, apparatus, computer program product of example embodiments of the present invention facilitate the mobility of the mobile terminals by allowing a mobile terminal to utilize cloud computing resources even as a mobile terminal moves relative to an access network via which the mobile terminal is accessing the cloud computing resources. Additionally, the method, apparatus and computer program product of example embodiments of the present invention support the utilization of cloud computing resources by a mobile terminal even in instances in which the mobile terminal is temporarily disconnected or otherwise is out of communication with the cloud computing resources.

One example embodiment of a mobile cloud computing system of the present invention is depicted in FIG. 2, although the mobile cloud computing system may be configured in a number of other manners in other embodiments. In the illustrated environment, however, a mobile terminal 20 utilizes the mobile cloud computing system in order to assess the cloud computing resources of one or more cloud service providers 22. The mobile terminal may be embodied as a variety of different mobile devices including as a mobile telephone, a personal digital assistant (PDA), a laptop computer, a tablet computer, a navigation system, a music player, a game player, computer workstation or any of numerous other computation devices, content generation devices, content consumption devices or combinations thereof. As a result of its mobility, the mobile terminal may be in communication with one or more radio access networks 24 which, in turn, may be in communication with the cloud service providers, either directly or via another network, such as a wide area network 28, for example, the internet. In this regard, various types of access network may be utilized by the mobile terminal in order to assess the cloud service providers. By way of example, the mobile cloud computing system of FIG. 2 depicts a cellular radio access network and a WiFi radio access network. However, the mobile terminal may communicate with other types of radio access networks with the cellular radio access network and the WiFi radio access network being provided by way of example, but not of limitations.

In accordance with some example embodiments of the present invention, the mobile cloud computing system may include one or more mobile hubs 26 disposed within or at an edge of a radio access network 24. In the illustrated example, each radio access network includes or is associated with a mobile hub. However, in other embodiments, mobile hubs may only be associated with some of the radio access networks, but not all of the radio access networks. Additionally, as will be described below, some radio access networks may include two or more mobile hubs disposed at different location throughout the respective radio access network.

As shown in FIG. 2; a mobile cloud computing system may also include a mobile cloud controller 30 that is configured to communicate with and to control the mobile hubs 26. As such, the mobile cloud controller in combination with the mobile hubs may be referenced as a mobile cloud service provider. The mobile cloud service provider facilitates utilization by the mobile terminal 20 of the cloud computing resources offered by the cloud service providers 22 and, in some embodiments, supports the mobility of the mobile terminal and manages intermittent communications with the mobile terminal by continuing to provide access to the cloud computing resources offered by the cloud service providers.

The mobile terminal 20 and the mobile hub 26 may each embody or otherwise be associated with an apparatus 40 that is generally depicted in FIG. 3 and that may be configured to perform various operations in accordance with example embodiments of the present invention as described below, such as in conjunction with FIGS. 8 and 11 from the perspective of the mobile hub and FIGS. 12 and 13 from the perspective of the mobile terminal. However, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 40 may include or otherwise be in communication with processing circuitry that is configurable to perform actions in accordance with example embodiments described herein. The processing circuitry may be configured to perform data processing, application execution and/or other processing and management services according to example embodiments of the present invention. In some embodiments, the apparatus or the processing circuitry may be embodied as a chip or chip set. In other words, the apparatus or the processing circuitry may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In some example embodiments, the processing circuitry may include a processor 42 and memory 44 that may be in communication with or otherwise control a communication interface 46 and optionally a user interface 48. As such, the processing circuitry may be embodied as a circuit chip (for example, an integrated circuit chip) configured (for example, with hardware, software or a combination of hardware and software) to perform operations described herein.

In an instance in which the apparatus 40 includes a user interface 48, such as in an instance in which the apparatus is embodied by a mobile terminal 20, the user interface may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In some example embodiments, the user interface may include user interface circuitry configured to facilitate at least some functions of the station by receiving user input and providing output.

The communication interface 46 may include one or more interface mechanisms for enabling communication with other computing devices and/or networks. In some cases, the communication interface may be any means such as a device or circuitry embodied in either hardware, or a combination of hardware and software that is configured to receive and/or transmit data from/to a radio access network 24, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. Additionally or alternatively, the communication interface may be configured to transmit and receive information or other signals via a proximity-based communication protocol, such as via Wi-Fi, NFC, BlueTooth™, WiMAX or the like.

In some example embodiments, the memory 44 may include one or more non-transitory memory devices such as, for example, volatile and/or non-volatile memory that may be either fixed or removable. The memory may be configured to store information, data, applications, instructions or the like for enabling the apparatus 40 to carry out various functions in accordance with example embodiments of the present invention. For example, the memory could be configured to buffer input data for processing by the processor 42. Additionally or alternatively, the memory could be configured to store instructions for execution by the processor. As described below, the memory may include one or more databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 42 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In some example embodiments, the processor may be configured to execute instructions stored in the memory 44 or otherwise accessible to the processor. As such, whether configured by hardware or by a combination of hardware and software, the processor may represent an entity (for example, physically embodied in circuitry—in the form of processing circuitry) capable of performing operations according to example embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIG. 4, an architectural representation of a mobile terminal 20, a mobile cloud service provider including a mobile cloud controller 30 and a plurality of mobile hubs 26, and a cloud service provider 22 is provided. As shown, the mobile terminal may include an applications layer, a mobile virtual machine (VM) layer, an operating system (OS) layer and a hardware layer. With reference to the apparatus 40 of FIG. 3 as embodied by a mobile terminal, the hardware layer may be comprised of the processor 42 and the memory 44 such that the applications, the components of the mobile virtual machine described below and the operating system are stored by the memory and executed by the processor as described below.

With respect to the mobile virtual machine layer of the mobile terminal 20, FIG. 5 illustrates one example embodiment in which the mobile virtual machine may include a plurality of components including an application programming interface (API) handler, an optimizer, a profiler, an analyzer and an application handler. Each of these components may be embodied by computer program instructions stored by the memory 44 and executed by the processor 42 in order to cause the respective functions to be performed. In some example embodiments, the API handler may include a plurality of APIs for applications to utilize in order to assess the local operating system and/or cloud services, such as by interacting with respect of APIs for the operating system and/or the APIs for the cloud services. The profiler maintains information regarding the various functions of the applications that utilize cloud services, information regarding the behavior of the user of the mobile terminal, such as the frequency with which the various applications are executed and cloud services are utilized, and information regarding the status of the mobile terminal such as the location of the mobile terminal, movement of the mobile terminal and instances in which the mobile terminal is unexpectedly disconnected from the radio access network 24 or the like. The profiler of some example embodiments is configured gather application data, user data and/or device data. Application data may include information about an application itself, for example, how much memory is required by the application, how much computation power/battery is used by the application, how often does the application use cloud services, how much data traffic is caused by the application, etc. User data may include information about user behavior, for example, the time and place when the user utilizes applications, how often and how long does the user utilize the applications, user preferences on using the applications, etc. Device data may include information about device status, for example, device memory usage, battery life, network status, etc. The profiler may cause the information to be stored, such as within memory 44, with the information providing context with respect to the mobile terminal and the applications executed by the mobile terminal relative to the utilization of the cloud services.

The analyzer may analyze the context information collected and recorded by the profiler and the optimizer may, in turn, at least partially control the request issued by the applications executed by the mobile terminal 20 for cloud services based upon the context information. The analyzer of some example embodiments is configured to analyze application data, user data and device data. For example, the analyzer may be configured to detect that the user is within a moving vehicle so that the optimizer will be configured to seek the best mobile hub 26 and cellular network for serving the mobile terminal. Subsequently, the analyzer of this example may detect that the user has enters into a café such that the optimizer, together with the mobile cloud controller 30, may be configured to seek a free WiFi access point to support the connection with the mobile terminal. As another example, based on the information about a user, the analyzer may have determined that the user with an smartphone opens a news reader application and reads news every morning and, in particular, reads financial news and information technology news. Based on the information, the optimizer of this example may be configured to preload financial and information techology news to the smartphone beforehand. The optimizer of this example, together with the mobile cloud controller, may be configured to select a suitable mobile hub along the user's route for providing the service quickly. The adaption handler may be configured to communicate with the mobile cloud service provider, such as a mobile hub 26, in order to provide requests for cloud services that have been issued by an application executing by the mobile terminal and to receive responses from the mobile client service provider. In addition, the adaption handler may provide context information relating to the mobile terminal to the mobile cloud service provider such that the mobile cloud service provider may modify or otherwise optimize its behavior based upon the context of the mobile terminal, such as by servicing the mobile terminal with a mobile hub that is closest to or is otherwise best able to communicate with the mobile terminal as described below. The adaption handler may communicate with the mobile cloud service provider in either a synchronous mode or an asynchronous mode.

With reference again to FIG. 4, an architectural representation of each mobile hub 26 is shown. While each mobile hub is shown to have the same components, some mobile hubs may have different combinations of the components in other embodiments. With respect to the example of FIG. 4, however, a mobile hub may include one or more application agents and one or more service agents. Each mobile home may also include a cloud virtual machine layer, resource pools and physical resources configured to support the application agents, service agents, cloud virtual machine and resource pools. In regard to the embodiment of FIG. 3 in which the apparatus 40 is embodied as a mobile hub, the physical resources may be embodied by the processor 42 and the memory 44 with the application agents, service agents, cloud virtual machine and resource pools stored by the memory and executed by the processor in order to provide the respective functionality.

As shown in FIG. 6, the cloud virtual machine of some embodiments may include components to provide various functions with the components being stored by the memory 44 and executed by the processor 42. In some example embodiments, the cloud virtual machine may include an application agent management component configured to manage the life cycle of the application agents including, for example, the start of an application agent, a pause to the execution of the application agent, the migration of the support for an application executed by a mobile terminal 20 to an application agent of another mobile hub 26 and the termination of an application agent. The cloud virtual machine may also include a device context management component configured to collect information from the mobile terminal including, for example, context information from the mobile terminal and to determine the current context of the mobile terminal. The device context management component may provide information regarding the context of the mobile terminal to the application agent management component to permit the application agent management component to correspondingly direct the respective application agent based upon the context of the mobile terminal. As described below, for example, in an instance in which the context information provided by the mobile terminal indicates that the mobile terminal has moved and would now be better or more efficiently served by an application agent of a different mobile hub, the application agent management component may communicate with the application agent in order to facilitate migration of the mobile terminal to an application agent of another mobile hub.

The cloud virtual machine may also include a service agent management component that is configured to manage the life cycle of service agents including the start, pause, migration and termination of a service agent. As shown in FIG. 6, the cloud virtual machine may also include a cloud environment management component for managing the cloud environment within the mobile hub 26 including, for example, adjustments to the manner in which the mobile hub reserves cloud resources based upon variations in the network traffic. Further, the cloud virtual machine may include a data management component, an account management component, a security management component, a resource management component or other components for facilitating the operation of the mobile hub within the mobile cloud computing system.

The mobile cloud service provider may also include a mobile cloud controller 30 that is configured to be in communication with and at least partially control the operations of the mobile hubs 26 as shown, for example, in FIG. 4. Although the mobile cloud controller may be configured in various manners, the mobile cloud controller of one embodiment is shown in FIG. 7 to include an administrator user interface which, in an instance in which the apparatus 40 of FIG. 3 is embodied as the mobile cloud computer, may be embodied by the user interface 48. The administrator user interface is configured to provide for management of the mobile cloud controller by an operator. The mobile cloud controller of the illustrated embodiment may also include a mobile hub management component that is configured to provide various functions for management of the mobile hubs including, for example, configuration at the mobile hubs. The mobile cloud controller of the illustrated embodiment may also include a device management component which is configured to provide functions for the management of devices including the mobile terminals, such as by providing client software for client downloading and upgrading. The mobile cloud controller of the example of FIG. 7 may further include a user management component configured to allow an administrator to manage user accounts that have been established, a security management component configured to enforce security mechanisms for the mobile cloud service provider, a reporting module configured to provide reporting functionality for an administrator, a data management component configured to provide data access, data mining, etc. and storage configured to store data in a database, such as the memory 44 of an apparatus embodied as the mobile cloud computer. The various components of the mobile cloud controller may be embodied as computer program instructions and stored by the memory and executed by the processor 42 of an apparatus of the type shown in FIG. 3 that is embodied by a mobile cloud controller. However, the mobile cloud controller of other example embodiments may include different combinations of components including fewer components, additional components or the like.

Referring now to FIG. 8, the operations performed by a mobile hub 26 in accordance with example embodiments of the present invention are illustrated. Although the operations performed by the mobile hub may be performed in a variety of different mobile cloud computing systems, one example of a portion of a mobile cloud computing system within which a mobile hub may perform the operations of FIG. 8 is shown in FIG. 9 with the signaling exchanged by the mobile hub in accordance with the operations described below in conjunction with FIG. 8 being shown in. FIG. 10. As shown in block 50 of FIG. 8 and also in FIG. 10, an apparatus 40 embodied by the mobile hub, such as the processor 42, communications interface 46 or the like, is configured to initially receive a request for cloud services that has been issued by an application executed by a mobile terminal 20. The request for cloud services may be issued by various types of applications and may be for a variety of cloud services including processing services in which at least a portion of the processing resources required by the execution of the application are offloaded to the cloud and/or the retrieval or storage of data by the application executed by the mobile terminal. As such, the apparatus embodied by the mobile hub may include means, such as the processer, the communication interface or the like, for receiving the request for cloud services issue by an application executed by the mobile terminal.

The apparatus 40 embodied by the mobile hub 26, such as the processor 42 or the like, also creates an application agent based upon the application that issued the request. See, for example, block 52 of FIG. 8 as well as FIG. 10. In the illustrated embodiment, the mobile hub, for example, Mobile Hub 1, may be configured to create an application agent, for example, App Agent 1, to process the request issued by the application executed by the mobile terminal 20 and to thereafter interact with the mobile terminal relative to the request for cloud services. Accordingly, the apparatus embodied by the mobile hub may include means, such as the processor of the like, for creating an application agent.

As shown in operations 54 and 56 of FIG. 8, the apparatus 40 embodied by the mobile hub 26, such as the processor 42, communications interface 46 or the like, may also be configured to cause a request to be transmitted to a cloud service provider 22 in response to the request for cloud services from the mobile terminal 20 and to receive a response from the cloud service provider. As shown in FIG. 10, the cloud service provider may process the request that is transmitted by the mobile hub and may generate an appropriate response. In this regard, the response may be an indication that the cloud service provider will or will not provide the cloud services requested by the application execute by the mobile terminal and, in an instance in which the response indicates that the cloud service provider will provide the cloud services, the response may provide a reservation for the provision of the respective cloud services by the cloud service provider. In some instances, the response that is provided by the cloud service provider and received by the mobile hub may include the results of having performed the requested cloud services, such as by providing data that has been requested, by providing the results of the processing services that were requested or the like. Regardless of the type of response, the apparatus embodied by the mobile hub may therefore include means, such as the processor, the communications interface or the like, for causing a request to be transmitted to a cloud service provider and means, such as the processor, the communications interface or the like, for receiving a response from the cloud service provider.

As shown in block 60 of FIG. 8 as well as in FIG. 10, the apparatus 40 embodied by the mobile hub 26, such as the processor 42, the communications interface 46 or the like, may be configured to cause a response to be provided to the mobile terminal 20 based on response from the cloud service provider 22. As described above, the response may be an indication as to whether or not the cloud service provider will provide the requested cloud service and, in instances in which the requested cloud service will be provided, may include a reservation for the respective cloud services. Alternatively, the response may provide the results of the requested cloud service itself, such as in a form of data or the like. Thus, the apparatus embodied by the mobile hub may include means, such as the processor, the communications interface or the like, for causing a response to be provided to the mobile terminal based upon the response from the cloud service provider.

As shown in block 62 FIG. 8, the apparatus 40 embodied by the mobile hub 26, such as the processor 42 or the like, may also be configured to terminate the application following provision of the response. For example, in an instance in which the response has provided to the mobile terminal 20 satisfies the request for cloud services that was previously issued by the mobile terminal, the application agent may be terminated following provision of the response. Additionally or alternatively, the application may be terminated following provision of the response in an instance in which the mobile hub does not receive another request for cloud services from the application executed by the mobile terminal for a predetermined period of time. As such, the apparatus embodied by the mobile hub may include means, such as the processor or like, for terminating the application agent following provision of the response.

As described above, the mobile hub 26 may be configured to support the access by a mobile terminal 20 of the cloud computing resources. As a result of its mobility or otherwise, a mobile terminal may sometimes be disconnected from or otherwise out of communication with the access network 24 and, in turn, the mobile hub while the cloud services are being provided to the mobile terminal. In this instance, the apparatus 40 embodied by the mobile hub, such as the processor 42, the memory 44 or the like, may be configured to cause the response from the cloud service provider 22 to be stored in an instance in which the mobile terminal is no longer in communication with the access network and, in turn, with a mobile hub, such as in an instance in which the mobile terminal is temporarily disconnected or otherwise temporarily out of communication with respect to the access network. See block 58 of FIG. 8. Thus, the apparatus embodied by the mobile terminal of this example embodiment may include means, such as the processor, the memory or the like, for causing the response from the cloud service provider to be stored.

Once the mobile terminal 20 has resumed communications with the access network 24, the apparatus 40 embodied by the mobile hub 26, such as the processor 42, communications interface 46 or the like, may be configured to cause a response that has been stored to be provided to the mobile terminal. Thus, the mobile hub of one embodiment permits continuity of the cloud services being provided for the mobile terminal even in an instance in which the mobile terminal is temporarily disconnected or otherwise out of communication with the access network and, in turn, with the mobile cloud computing system.

In order to support the access by a mobile terminal 20 of cloud computing resources, the mobile hub 26 may be configured to continue to support the mobile terminal's utilization of cloud computing resources as the mobile terminal moves relative to the access network. In this example embodiment and as shown in block 70 of FIG. 11, the apparatus 40 embodied by the mobile hub, such as the processor 42, the communications interface 46 or the like, may be configured to receive context information from the mobile terminal. A variety of context information may be received including context information that identifies the location of the mobile terminal. In this regard, the location of the mobile terminal may be identified in various manners including as a geographic location of the mobile terminal, a location based upon the network entities, such as the base station, access points or the like, servicing the mobile terminal or in other manners. The apparatus embodied by the mobile hub may therefore include means, such as the processor, the communications interface, or the like, for receiving context information from the mobile terminal.

As shown in block 72 of FIG. 11 and in FIG. 10, the apparatus 40 embodied by the mobile hub 26, such as the processor 22 or the like, may be configured to determine that the mobile terminal 20 has moved to another region. In this regard, the apparatus embodied by the mobile hub, such as the processor, may make the determination that the mobile terminal has moved to another region based upon the context information and, more particularly, based upon information regarding the location of the mobile terminal. The various regions may be defined based upon the locations of the mobile hubs of the mobile cloud computing system with each region being defined proximate a respective mobile hub so as to define a region within which the respective mobile hub is expected to service the mobile terminals within the respective region. The apparatus embodied by the mobile hub of this environment may therefore include means, such as a processor of the like, for determining that the mobile terminal has moved to another region that is most effectively served by a different mobile hub based upon the context information.

The apparatus 40 embodied by the mobile hub 26, such as the processor 42 or the like, may therefore also be configured to identify a different mobile hub to support the mobile terminal 20 within the other region to which the mobile terminal has moved. See block 74 of FIG. 11. Although the mobile hub may be configured to identify the different mobile hub in various manners, the apparatus embodied by the mobile hub of some example embodiments, such as the processor, communications interface 46 or the like, may be configured to generate an inquiry to the mobile cloud controller 30 soliciting the identification of a mobile hub to support the mobile terminal within the other region. As shown in FIG. 10, the mobile cloud controller may, in turn, generate a response identifying the different mobile hub such that the apparatus embodied by the mobile hub, such as the processor, the communications interface or the like, may be configured to receive the response from the mobile cloud controller identifying the different mobile hub. Regardless of the manner in which the different mobile hub is identified, the apparatus embodied by the mobile hub may therefore also include means, such as the processor of the like, for identifying a different mobile hub to support the mobile terminal in relation to its request for cloud services.

As shown in block 76 of FIG. 11 as well as in FIG. 10, the apparatus 40 embodied by the mobile hub 26, such as the processor 42, the communications interface 46 or the like, may also be configured to cause information regarding the different mobile hub to be provided to the mobile terminal 20. For example, the mobile hub maybe configured to provide the identity or address of the different mobile hub to the mobile terminal such that the mobile terminal may thereafter establish communications with the different mobile hub as shown in FIGS. 9 and 10. Thus, the apparatus embodied by the mobile hub of this example embodiment may include means, such as the processor, the communications interface or the like, for causing information regarding the different mobile hub to be provided to the mobile terminal.

As shown in FIGS. 9 and 10, the mobile terminal 20 may thereafter communicate with the different mobile hub, such as Mobile Hub 2, in regards to the request for cloud services. As described above, Mobile Hub 2 may create an application agent, for example, App Agent 2, which may, in turn, issue a request to the cloud service provider 22 for the requested cloud services. After having processed the request, the cloud service provider may provide a response to Mobile Hub 2 which may, in turn, provide a corresponding response regarding the request for cloud services to the mobile terminal in the same or a similar manner to that described above in conjunction with the operations of Mobile Hub 1.

However, by migrating the support of the cloud services request issued by the mobile terminal from one mobile hub to another mobile hub as the mobile terminal moves relative to the access network 24, the mobile cloud computing system of example embodiments of the present invention may continue to provide cloud services to the mobile terminal even as the mobile terminal moves.

From the perspective of a mobile terminal 20, FIG. 12 illustrates the operations performed by an apparatus 40 embodied by the mobile terminal in accordance with example embodiments of the present invention. As shown in block 80 of FIG. 12, the apparatus embodied by the mobile terminal, such as the processor 42 or the like, may be configured to execute an application. As noted above, the mobile terminal may execute a wide variety of applications that may, in turn, desire to utilize cloud computing resources. Thus, the apparatus embodied by the mobile terminal may include means, such as the processor or the like, for executing an application. Based upon the execution of the application, the apparatus embodied by the mobile terminal, such as the processor, the communications interface 46 or the like, may be configured to cause a request for cloud services to be issued to a mobile hub 26 that is associated with a communications network, for example, with a radio access network 24. See, for example, block 82 of FIG. 12 as well as the foregoing discussion regarding the request for cloud service issued by the application executed by the mobile terminal in conjunction with the receipt of the request by the mobile hub. The apparatus embodied by the mobile terminal of example embodiment therefore may include means, such as a processor, the communications interface or the like, for causing a request for cloud services to be issued to a mobile hub.

As shown in block 86 of FIG. 12, the apparatus 40 embodied by the mobile terminal 20 of this example embodiment, such as the processor 42, the communications interface 46 or the like, may also be configured to receive the response to the request from the cloud service provider 22 via the mobile hub 26. In this regard, the response may be an indication as to whether the cloud service provider will provide the requested cloud service or declines to provide the requested cloud service or may be the result of having performed the requested cloud service itself, such as by providing data that is retrieved or generated as a result of processing activity offloaded by the mobile terminal. Regardless of the type of request, the apparatus embodied by the mobile terminal of this example embodiment may include means, such as the processor, the communications interface or the like, for receiving the response to the request from the cloud service provider via the mobile hub.

The apparatus 40 embodied by the mobile terminal 20, such as the processor 42 or the like, may thereafter continue the execution of the application based at least in part upon the response to the request. In this regard, in an instance in which response substantively responds to the request, such as by providing data or other results of some processing activity, the application may continue to be executed while taking into account the data provided by the cloud service provider 22. Alternatively, in an instance in which the cloud service provider does not substantively respond to the request, but indicates that the cloud service provider may subsequently service the request for cloud service, the execution the application may continue by requesting the cloud service be performed and then awaiting the result from the cloud service provider of the performance of the requested cloud service. Still further, in an instance in which the response indicates the cloud service provider is unable to provide the requested cloud service, the mobile terminal they continue with the execution the application by issuing a request for cloud services to another cloud service provider or by performing the functionality that the mobile terminal otherwise look to off load to the cloud service itself. Thus, the apparatus embodied by the mobile terminal may include means, such as the processor or the like, for continuing the execution of the application based at least in part upon the response to the request.

As indicated above in conjunction with the discussion of the mobile hub 26, the mobile terminal 20 may occasionally be temporarily disconnected or otherwise temporarily out of communication with the access network 24, and, in turn, with the mobile hub and the remainder of the mobile cloud computing system. Indeed, block 84 of FIG. 12 indicates that the apparatus 40 embodied by the mobile terminal, such as the processor 42, the communications interface 46 or like, may temporarily fail to be in communication with the mobile hub. In this instance, the mobile hub may store the response from the cloud service provider 22 that would otherwise have been provided to the mobile terminal and may cause the response to be provided to the mobile terminal once the mobile terminal has again established communication with the access network and, in turn, with the mobile hub.

As described above in conjunction with FIG. 11, the method, apparatus computer program product of an example embodiment continues to support a mobile terminal's utilization of cloud services even as the mobile terminal 20 moves with respect to the access network 24 via which the mobile terminal access the cloud service providers 22. In this regard, the apparatus 40 embodied by the mobile terminal, such as the processor 42, the communications interface 46 or the like, may be configured to cause context information including, for example, location information to be provided to the mobile hub 26. See block 90 of FIG. 13. In some instances, such as in an instance in which a mobile terminal has moved relative to the access network so as to be closer to or otherwise more effectively serviced by a different mobile hub than the mobile hub with which the mobile terminal is in communication, the apparatus embodied by the mobile terminal, such as the processor, the communications interface or the like, may be configured to receive information regarding the different mobile hub that will provide support to the mobile terminal with respect to cloud service while in another region. See block 92 of FIG. 13. The apparatus embodied by the mobile terminal, such as the processor, the communications interface or the like, may also be configured to cause a subsequent request for cloud service to be issued to the different mobile hub while the mobile terminal remains within the other region. See block 94 of FIG. 13 as well as FIG. 10 following the transition to Mobile Hub 2 from Mobile Hub 1.

Accordingly, the apparatus 40 embodied by the mobile terminal 20 of some embodiments may include means, such as the processor 42, the communications interface 46 or the like, for causing context information to be provided to the mobile hub 26, for receiving information regarding a different mobile hub that will provide support for cloud services while the mobile terminal is in another region, and for causing a subsequent request to be issued to a different mobile hub while the mobile terminal remains within the other region. Accordingly, the method, the apparatus, computer program product this example embodiment facilitates mobility of the mobile terminal relative to one or more access networks 24 and, in turn, relative to one or more mobile hubs 26 and the remainder of the mobile cloud computing system. As such, the mobile terminal of this example embodiment may enjoy continuity with respect to the provision of cloud services even as a mobile terminal is relocated.

As noted above, FIGS. 8 and 11-13 are flowcharts illustrating the operations performed by a method, apparatus and computer program product, such as apparatus 40 of FIG. 3, from the perspective of the mobile hub 26 in regards to FIGS. 8 and 11 and the mobile terminal 20 in regards to FIGS. 12 and 13 in accordance with example embodiments of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 44 of an apparatus employing an embodiment of the present invention and executed by a processor 42 of the apparatus. As will be appreciated, any such computer program instructions may be loaded onto a computer or other programmable apparatus (for example, hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 8 and 11-13, when executed, convert a computer or processing circuitry into a particular machine configured to perform example embodiments of the present invention. Accordingly, the operations of FIGS. 8 and 11-13 define an algorithm for configuring a computer or processing circuitry, for example, processor, to perform example embodiments. In some cases, a general purpose computer may be provided with an instance of the processor which performs the algorithm of FIGS. 8 and 11-13 to transform the general purpose computer into a particular machine configured to perform example embodiments.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, certain ones of the operations above may be modified or further amplified as described below. Moreover, in some embodiments additional optional operations may also be included, such as illustrated by the operations represented by blocks with dashed lines in FIGS. 8 and 12. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method implemented by a mobile hub, the method comprising:
   receiving a request for cloud service issued by an application executed by a mobile terminal;
   creating an application agent based upon the application that issued the request, wherein the application agent is configured to thereafter interact with the mobile terminal relative to the request for the cloud service;
   causing a request to be transmitted to a cloud service provider in response to the request for the cloud service;
   receiving a response from the cloud service provider;
   causing a response to be provided to the mobile terminal based upon the response from the cloud service provider;
   identifying, by the mobile hub, a different mobile hub to support the mobile terminal within another region to which the mobile terminal has moved; and
   causing information regarding the different mobile hub to be provided by the mobile hub to the mobile terminal.

2. A method according to claim 1 further comprising receiving context information from the mobile terminal.

3. A method according to claim 2 further comprising:
   determining that the mobile terminal has moved to the other region based upon the context information.

4. A method according to claim 3 wherein identifying the different mobile hub comprises:
   generating an inquiry to solicit the different mobile hub to support the mobile terminal within the other region; and
   receiving a response identifying the different mobile hub.

5. A method according to claim 1 further comprising terminating the application agent following provision of the response.

6. A method according to claim 1 further comprising causing the response from the cloud service provider to be stored in an instance in which the mobile terminal is no longer in communication, and wherein causing the response to be provided comprises causing the response that has been stored to be provided to the mobile terminal once the mobile terminal has resumed communications.

7. An apparatus embodied by a mobile hub and comprising at least one processor and at least one memory including computer program instructions, the at least one memory and the computer program instructions configured to, with the at least one processor, cause the apparatus at least to:
receive a request for cloud service issued by an application executed by a mobile terminal;
create an application agent based upon the application that issued the request, wherein the application agent is configured to thereafter interact with the mobile terminal relative to the request for the cloud service;
cause a request to be transmitted to a cloud service provider in response to the request for the cloud service;
receive a response from the cloud service provider;
cause a response to be provided to the mobile terminal based upon the response from the cloud service provider;
identify, by the mobile hub, a different mobile hub to support the mobile terminal within another region to which the mobile terminal has moved; and
cause information regarding the different mobile hub to be provided by the mobile hub to the mobile terminal.

8. An apparatus according to claim 7 wherein the at least one memory and the computer program instructions are further configured to, with the at least one processor, cause the apparatus to receive context information from the mobile terminal.

9. An apparatus according to claim 8 wherein the at least one memory and the computer program instructions are configured to, with the at least one processor, cause the apparatus to:
determine that the mobile terminal has moved to the other region based upon the context information.

10. An apparatus according to claim 9 wherein the at least one memory and the computer program instructions are configured to, with the at least one processor, cause the apparatus to identify the different mobile hub by:
generating an inquiry to solicit the different mobile hub to support the mobile terminal within the other region; and
receiving a response identifying the different mobile hub.

11. An apparatus according to claim 7 wherein the at least one memory and the computer program instructions are further configured to, with the at least one processor, cause the apparatus to terminate the application agent following provision of the response.

12. An apparatus according to claim 7 wherein the at least one memory and the computer program instructions are further configured to, with the at least one processor, cause the apparatus to cause the response from the cloud service provider to be stored in an instance in which the mobile terminal is no longer in communication, and wherein the at least one memory and the computer program instructions are configured to, with the at least one processor, cause the apparatus to cause the response to be provided by causing the response that has been stored to be provided to the mobile terminal once the mobile terminal has resumed communications.

13. A computer program product comprising at least one non-transitory computer-readable medium bearing computer program instructions embodied therein for use with a mobile hub, the computer program instructions comprising instructions configured to:
receive a request for cloud service issued by an application executed by a mobile terminal;
create an application agent based upon the application that issued the request, wherein the application agent is configured to thereafter interact with the mobile terminal relative to the request for the cloud service;
cause a request to be transmitted to a cloud service provider in response to the request for the cloud service;
receive a response from the cloud service provider;
cause a response to be provided to the mobile terminal based upon the response from the cloud service provider;
identify, by the mobile hub, a different mobile hub to support the mobile terminal within another region to which the mobile terminal has moved; and
cause information regarding the different mobile hub to be provided by the mobile hub to the mobile terminal.

14. A computer program product according to claim 13 wherein the computer program instructions further comprise instructions configured to receive context information from the mobile terminal.

15. A computer program product according to claim 14 wherein the computer program instructions further comprise instructions configured to determine that the mobile terminal has moved to the other region based upon the context information.

16. A computer program product according to claim 15 wherein the instructions configured to identify the different mobile hub comprise instructions configured to:
generate an inquiry to solicit the different mobile hub to support the mobile terminal within the other region; and
receive a response identifying the different mobile hub.

17. A computer program product according to claim 13 wherein the computer program instructions further comprise instructions configured to terminate the application agent following provision of the response.

18. A computer program product according to claim 13 wherein the computer program instructions further comprise instructions configured to cause the response from the cloud service provider to be stored in an instance in which the mobile terminal is no longer in communication, and wherein the instructions configured to cause the response to be provided comprise instructions configured to cause the response that has been stored to be provided to the mobile terminal once the mobile terminal has resumed communications.

* * * * *